INVENTORS
Bořivoj Dubský · Oldřich Straka ·
Josef Jahelka · Václav Sedláček 3,042,858
ELECTROMAGNETIC CIRCUITS FOR INDIRECTLY EXCITED ELECTROMAGNETIC FEELERS
Bořivoj Dubský, Oldřich Straka, and Josef Jahelka, Prague, and Václav Sedláček, Horni Pocernice, Czechoslovakia, assignors to Vyzkumný a zkušební letecký ustav, Letnany, near Prague, Czechoslovakia
Filed Sept. 23, 1958, Ser. No. 762,844
Claims priority, application Czechoslovakia Oct. 22, 1957
4 Claims. (Cl. 324—34)

The present invention relates to circuits for measuring the output signals of indirectly excited electromagnetic feelers. Such feelers are disclosed in copending application Serial No. 762,729, filed concurrently herewith and entitled "Indirectly Excited Electromagnetic Feeler."

Electric feeler circuits using the so-called Wiedemann effect are usually arranged in such a way that the feeler is connected to the central branch of a bridge together with a direct current measuring instrument, and connected in the outer branches of the bridge are receiving coils of a polarisation feeler or the secondary winding of a polarisation transformer and rectifier, or the circuit comprises no rectifiers and the unbalance in the bridge is compensated automatically by means of a servomechanism which serves for shifting the rider of a potentiometer connected to the branches of the bridge. The last mentioned circuit is suitable for measuring a proportion or ratio of mechanical values. All such circuits require an apparatus by means of which a polarisation voltage of equal phase is produced i.e. either an independent one, a so-called polarisation feeler, or a polarisation transformer.

The main feature of the electronic circuit for indirectly excited electromagnetic feelers, to which the present invention relates, resides in the fact that the polarisation voltage required for shifting the operational point of the rectifiers to a linear zone or for operating a servomechanism by which a potentiometer is controlled for varying the voltage drop thereacross is obtained from a separate winding which together with the exciting toroidal winding is wound on the annular cores of the feelers.

A source of polarisation voltage with a low inner resistance is thus obtained simply and at small expense, said source supplying a voltage which has an exactly the same phase as the voltage induced in the pickup coils of the feeler.

The accompanying drawing shows by way of example in a diagrammatic representation the arrangement according to the invention.

Figure 1:
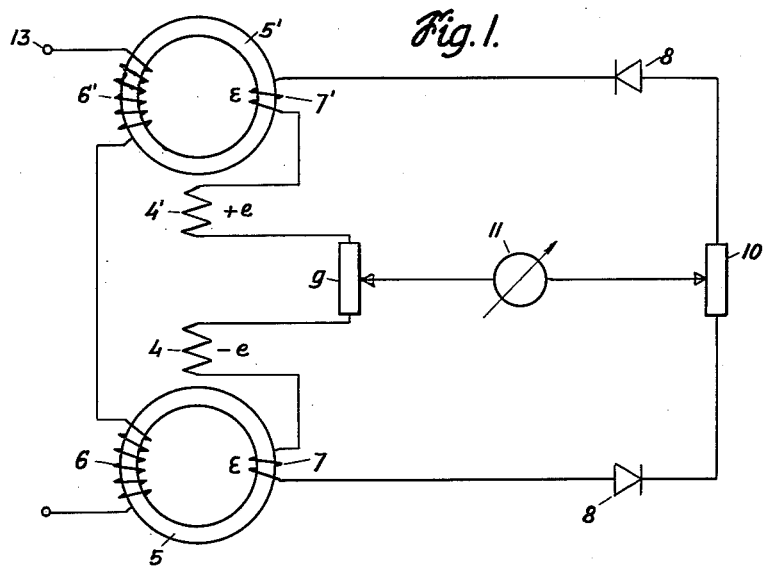
Figure 2:
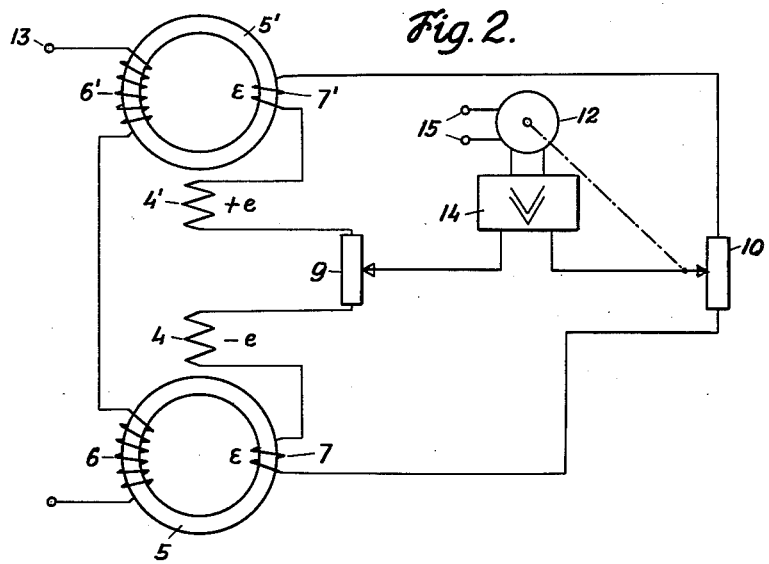

FIG. 1 represents a circuit with rectifiers, and
FIG. 2 a circuit with a potentiometer controlled by a servomechanism.

In the circuit according to FIG. 1 the cores of the feeler 5, 5' are respectively provided with auxiliary windings 7 and 7' in addition to the toroidal exciting windings 6 and 6'. The end of the winding 7 is connected to the beginning of the pickup coil 4. The end of this coil 4 is attached to the end of the potentiometer 9 for zero setting, the other end of the potentiometer being connected to the beginning of the other pickup coil 4'. The other end of this coil 4' is attached to the beginning of the winding 7', the end of which is connected by means of a rectifier 8, a compensation potentiometer 10 and another rectifier 8 to the start of the winding 7. Connected between the riders of the potentiometers 9 and 10 is a measuring instrument 11.

Alternating current supplied to the toroidal windings 6 and 6' induces in the windings 7 and 7' a voltage ϵ which has the same shape and phase as the voltages ±e induced in the pickup coils 4 and 4', which voltages in turn are proportional to the measured torque. These voltages have in the two coils 4 and 4' a mutually opposed sense, which correspond to the mutually opposed sense of the longitudinal components of the magnetic field resulting from deformation of the latter in double feelers by the application of the torque to be measured.

In simple feelers the same effect is achieved by connecting the pick-up coils of a single feeler to the branch between the riders of the potentiometers 9 and 10, i.e. in series with the measuring instrument 11. The current which in consequence of the polarisation voltage ϵ flows through the circuit of the potentiometers 9 and 10 shifts the operational point of the rectifiers 8 to the linear zone. Due to the voltage drop produced by this current on the potentiometers 9 and 10, a voltage is obtained for zero-setting of the instrument (potentiometer 9) and for the compensation of the measured voltage, with the result that the range of the measuring instrument may be extended (the potentiometer 10 is usually carried out as a decade of resistances with a throw-over switch).

The circuit according to FIG. 2 is carried out in a similar way as that described in FIG. 1, the only difference being that there are no rectifiers 8, i.e. the beginning of the winding 7 is connected to the end of the winding 7' by means of the potentiometer 10, and that an amplifier 14 has its input connected between the riders of the potentiometers 9 and 10. Attached to the output of the amplifier 14 is the control phase of a two-phase asynchronous servomotor 12, which controls the movement of the rider of the potentiometer 10. The exciting phase of the servomotor 12 is attached to an alternating current source 15.

In the circuit of FIG. 2 the voltage unbalance in the branch between the riders of potentiometers 9 and 10, which is caused by the voltages ±e induced in the pick-up coils 4 and 4', is automatically compensated by the position of the rider of the potentiometer 10 which is connected to the servomotor 12. The position of the rider of the potentiometer 10 is proportional to the expression $$\frac{e}{\epsilon}$$

By a suitable choice of the number of windings of the coils 7 and 7', a voltage ϵ of any required value and also any desired sensitivity of the whole circuit to the voltage e may be obtained. By switching over to various branches provided on the coils 7 and 7' the measuring range of the whole circuit may be altered. The voltage ϵ being also dependent on the temperature, on the variations of the exciting voltage source 13 and the like, as the voltage e, this circuit permits to eliminate any effect of outer influences on the exactness of measurements.

We claim:
1. In combination with an electromagnetic feeler comprising first and second core means respectively having first and second exciting coil means supplied with alternating current and operative to produce an alternating magnetic field which is deformed in response to torsional stressing of the feeler, and first and second pickup coil means having voltages of opposite polarity induced therein by deformation of the magnetic field, with the induced voltages being proportional to the magnitude of the torsional stressing; a measuring circuit comprising first and second auxiliary coil means wound on said first and second core means, respectively, for providing polarizing voltages of the same phase as said induced voltages, and bridge circuit means including at least first and second branch circuit electrical paths, said first pickup coil means and said first auxiliary coil means being connected in series in said first branch circuit electrical path, said second pickup coil means and said second auxiliary coil means being connected in series in said second branch circuit electrical path.

2. The combination as in claim 1; wherein said bridge circuit means further includes first and second potentiometers connected between said first and second branch circuit electrical paths and having movable taps and meter means connected between said movable taps to indicate the magnitude of said induced voltages as a function of the torsional stressing of said feeler.

3. The combination as in claim 2; wherein each of said first and second branch circuit electrical paths further has rectifier means therein.

4. The combination as in claim 1; wherein said bridge circuit means further includes first and second potentiometers connected between said first and second branch circuit electrical paths and having movable taps, amplifying means having an input connected to said movable taps and an output, and servomechanism means having a control phase connected to said output for actuation of said servomechanism thereby, said servomechanism being connected to said movable tap of one of said potentiometers for varying the position of such movable tap as an indication of the magnitude of said induced voltages and hence of the torsional stressing of said feeler.

References Cited in the file of this patent

UNITED STATES PATENTS

| | | |
|---|---|---|
| 2,718,620 | Howe | Sept. 20, 1955 |
| 2,805,482 | Schonstedt | Sept. 10, 1957 |
| 2,887,882 | Richter | May 26, 1959 |
| 2,935,680 | Bendix et al. | May 3, 1960 |